Patented Nov. 5, 1940

2,220,293

UNITED STATES PATENT OFFICE 2,220,293

VARNISH OIL AND METHOD OF TREATING SAME

Ralph F. Schneider and Ralph Howard Coe, Chicago, Ill., and Elmer E. Ware, East Cleveland, Ohio, assignors to The Sherwin-Williams Company, Cleveland, Ohio, a corporation of Ohio No Drawing. Application August 23, 1938,
Serial No. 226,326

2 Claims. (Cl. 134—56)

This invention relates to varnish oils and has for its principal object the improvement of their drying or film-forming qualities. More specifically, the invention relates to tung oil and the treatment thereof to control gelation during polymerization to insure maximum drying qualities. This application is a continuation in part of our application Serial No. 37,212, filed August 21, 1935.

Several processes for the treatment of tung oil have been proposed, such as rapid heating and cooling through the critical temperature range; and the use of gel inhibiting catalysts. These methods involve the production of decomposition products which influence the solubility of the gel in the unpolymerized constituents.

Although tung oil is normally very fast drying, when heated according to the ordinary gelation control methods, particularly the second one mentioned above, some of the drying strength seems to be lost, necessitating the use of abnormally large amounts of metallic driers.

Those familiar with the known methods of treating tung oil have recognized the fact that viscosity increase on heating of tung oil is not a uniform function of the degree of polymerization, although heretofore it has been difficult, if not impossible, to promote useful polymerization without subjecting the oil to heavy increase in viscosity frequently even to complete gelation.

Tung oils in which the gelled polymer is present to any appreciable extent are relatively less soluble in the ordinary varnish solvents and generally exhibit poor drying qualities.

We have found that by the addition of small quantities of soluble iron compounds, preferably iron linoleate, to the oil during heating, the gelation is modified and the polymerization proceeds to the preferred fast drying non-frosting type, from which varnishes may be made which exhibit exceptionally fast drying and require the minimum quantities of metallic drying salts to promote initial set and final dry well within the time ordinarily required for these functions. While lead linoleate and thorium linoleate have been heretofore suggested, we have found that the results obtained by the use of these materials are very different from the results obtained with iron linoleate. We have prepared varnishes which were alike in all respects except that different linoleates were used, the same being the iron, lead, cobalt, manganese and thorium linoleates. No other driers were used.

Wood panels were then coated with these different varnishes, three coats being applied to each panel and then the panels were exposed to the same weather conditions for a period of between two and three months. In coating the panels we allowed a drying time of forty-eight hours between coats, and while the iron linoleate varnish dried in eighteen hours, the others required from three to four days to dry under ordinary conditions and, therefore, we dried the panels in a warm place, the temperature being about 100° F. As a result of these tests we have conclusively established that the effect of the iron linoleate on the tung oil is radically different from that of each of the other linoleates mentioned. While the iron linoleate varnish dried to a good gloss and gave a film which showed good durability on the exposure test, the other varnishes had a lower gloss and in the exposure test went flat and became checked. It is a well known fact that the use of driers results in shortening the life of the film and that the more drier used the sooner the film becomes brittle and breaks down, so that our process of treating the oil, because of the reduction in the amount of drier required, has the advantage of increasing the life of the film. A further advantage is that films from oil made by this process may be recoated without lifting while still quite "tacky."

The following examples illustrate useful formulas and successful procedure whereby sealing oils and waterproof varnishes may be manufactured. In each example is shown a small quantity of inhibitive catalyst. This material is not essential to the success of the operation but it does make the operation easier to carry out on a slow fire or by a less skilled operator. Contrary to the experiences in the use of these anti-catalysts according to earlier methods, they seem to have little if any effect on the ultimate drying of the materials made in accordance with the formulas given in the following examples.

Varnishes made according to the examples given require the use of only about one to one and one-half gallons of liquid drier per hundred gallons of varnish as compared to three to five gallons required if ordinary methods be used in the cooking of the varnish. They also exhibit maximum water and solvent resistance when dry and are relatively insensitive to frosting from combustion gases or chilling.

EXAMPLE NO. 1

*Boiled tung oil*

| | | |
|---|---|---|
| Inhibitive catalyst | oz | ⅕ |
| Iron linoleate | lb | ½ |
| Tung oil | gals | 50 |
| Mineral spirits | gals | 50 |

Heat the tung oil to 350° F. Add the inhibitive catalyst. Heat to 400° F. and add the iron linoleate. Stir and heat to 500° F. Cool kettle to 480° F. Let cool for body and reduce.

Example No. 2

*Mixing varnish*

| | |
|---|---|
| Ester gum _____ lbs__ | 100 |
| Inhibitive catalyst _____ oz__ | 1/5 |
| Iron linoleate _____ lb__ | 1/2 |
| Tung oil _____ gals__ | 40 |
| Turpentine _____ gals__ | 10 |
| Mineral spirits _____ gals__ | 50 |

Melt the ester gum in 5 gallons of tung oil to 300° F. and use as a check. In another kettle heat 35 gallons of tung oil to 350° F. and add the inhibitive catalyst. Heat to 400° F. and add the iron linoleate. Heat to 580° F. and add the above check. Cool to 480° F. Let cool for body and reduce.

Example No. 3

*Spar type mixing varnish*

| | |
|---|---|
| East India copal _____ lbs__ | 96 |
| Iron linoleate _____ lb__ | 1/4 |
| Inhibitive catalyst _____ oz__ | 1/10 |
| Tung oil _____ gals__ | 24 |
| Blown fish oil _____ gals__ | 6 |
| Perilla oil _____ gals__ | 6 |
| Mineral spirits _____ gals__ | 60 |

Heat the tung oil to 350° F. and add the inhibitive catalyst. Heat to 400° F. and add the iron linoleate. Stir and heat to 525° F. Pull from the fire and add the perilla oil and the fish oil. Add the gum. Heat to 580° F. with stirring. Cool kettle to 540° F. Let cool and reduce.

The inhibitive catalyst in the above examples may be oil soluble selenium, antimony sulphur, or arsenic compounds.

While in the foregoing examples we have specified definite amounts of the iron compound which do not cause any apparent darkening of the varnish, it is possible to use relatively larger amounts of the iron compound, although this may result in some darkening of the varnish and the invention is, therefore, not limited to the exact proportions stated in the examples. While we have specifically mentioned tung oil, we have found that similar results may be obtained by the use of oiticica, which is a Brazilian product of a constitution similar to tung oil and it will be understood that where we have used the term "tung oil" in the claims, we intend the term to include its equivalent "oiticica."

In the foregoing examples we have specifically mentioned iron linoleate. The iron compound works on the fatty acid and if linseed oil is cooked with the tung oil and iron sulphate, chloride, acetate or naphthenate is used in place of the linoleate, the linseed oil will react with any of these iron compounds and form the linoleate which will act on the tung oil even though linseed oil is present. If no linseed oil is used, these iron compounds will react with the tung oil to form the tungate. Hence it is possible to obtain the desired results by using the various iron compounds mentioned. We have also found that if an iron stirrer is used during the cooking, the fatty acid will react with the iron and substantially the same results will be obtained as when the iron linoleate is introduced directly.

Having thus described our invention, we claim:

1. The hereindescribed method of treating tung oil to inhibit gelation during polymerization and to give to the oil the quality of forming a non-frosting relatively fast-drying film which consists in heating the oil to about 400° F., then incorporating therein iron linoleate in the proportion of not substantially less than one-half pound to fifty gallons of tung oil, then heating to at least 500° F. while stirring to effect the desired degree of polymerization, and then cooling the oil and adding a thinning material.

2. A polymerized non-frosting relatively fast-drying tung oil the polymerization of which has been effected by first heating to about 400° F., then incorporating therein iron linoleate in the proportion of not substantially less than one-half to fifty gallons of the tung oil and then heating to at least 500° F., and stirring until polymerized to the desired degree.

RALPH F. SCHNEIDER.
RALPH HOWARD COE.
ELMER E. WARE.